Figure 1:
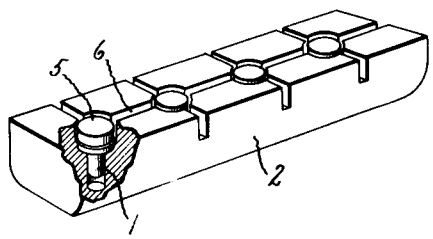

W. D. COOLIDGE.
METHOD OF JOINING METALS.
APPLICATION FILED JAN. 28, 1913.

1,181,741. Patented May 2, 1916.

WITNESSES:

INVENTOR:
WILLIAM D COOLIDGE
BY
HIS ATTORNEY.

UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

METHOD OF JOINING METALS.

1,181,741.  Specification of Letters Patent.  Patented May 2, 1916.

Original application filed March 20, 1912, Serial No. 685,113. Divided and this application filed January 28, 1913. Serial No. 744,608.

*To all whom it may concern:*

Be it known that I, WILLIAM D. COOLIDGE, a citizen of the United States, residing at Schenectady, county of Schenectady, State of New York, have invented certain new and useful Improvements in Methods of Joining Metals, of which the following is a specification.

The present application is a division of my application for electrical contacts and methods of making the same, filed March 20, 1912, Serial No. 685,113, (issued June 23, 1914, as Patent No. 1,101,062.)

The present invention comprises a method of joining metallic bodies to each other, so as to obtain a mechanically strong union having the best electrical and heat conductivity.

Various methods are known for joining metals to each other, most of which fall roughly into two classes, namely, welding, which involves a fusion of the contiguous metals and brazing or soldering which involves the use of an alloy and also usually a flux. There are cases where neither method will answer, for example, because of the extent of the surface to be joined, the refractoriness or oxidizability of the metal, or the chemical effect of one or more of the constituents of the soldering alloy.

Copper, and also silver, make excellent joining metals but difficulties are encountered in securing adherence of these metals to such a metal as iron. According to one method heretofore used iron to be coated is brought into contact with copper heated to a temperature considerably above its melting point to secure an adherent film. In order to join an article thus coated to another article, copper is cast into contact with the coated surfaces. This method has manifest mechanical disadvantages, and for some purposes has been found to be inoperative. It has also been suggested to secure the desired adherence of copper to steel or the like by means of carbon, but the effect of carbon is not only restricted as to area but its chemical effect in some cases is very undesirable.

In accordance with my invention, the metals to be united with copper or the like for example, tungsten or iron, are brought into contact with copper or silver in a hydrogen, or other suitable reducing atmosphere. Under this reducing condition the copper is in some way affected so that it readily flows over and wets the surface of a more refractory metal, and may be made to spread out upon the same as a very thin perfectly adherent film.

Although my invention is not limited to metallically joining tungsten to copper, or to joining tungsten to other metals by a film of copper, I will describe an embodiment of my invention as applied to the production of a tungsten make and break contact for induction coils and the like.

Figure 2:
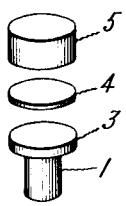
Figure 3:
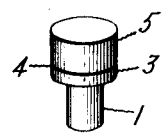

In the accompanying drawings illustrating my invention as applied to the joining of tungsten to steel, Figure 1 shows a form or mold suitable for holding the metals to be joined during the process of heating in hydrogen; Fig. 2 shows the parts of a contact of tungsten before it is metallically united; and Fig. 3 shows a completed contact made in accordance with my invention.

Tungsten cannot be joined satisfactorily to other metals by soldering in the ordinary manner. This difficulty is apparently due to the ease with which a thin film of oxid forms on the surface of the tungsten. The soldering metal either will not stick or when apparent adhesion has been produced I find that when subjected to any strain the soldering metal breaks away as though the tungsten broke away from the film of oxid.

In carrying out the process I find it highly desirable to completely remove from the surface of the tungsten body all the loosely adherent metal or oxid which I find is left by the preliminary process of shaping the tungsten. Unless this is done, I find that in some cases the tungsten may be torn away from its backing or support at this loosely adherent surface layer, part of which will be found clinging to the copper or other metal used as solder. In order to remove this surface layer I prefer to bring the body of tungsten into contact with melted nitrite of sodium, or potassium, for a few seconds, or with hot caustic potash or caustic soda solution for a longer time. This leaves a perfectly bright surface of solid metal.

When it is desired to fasten a small disk of tungsten to a tack or backing of steel, which may then be conveniently riveted or otherwise fastened to terminal supports, the operation may be carried out as follows:—
An iron or steel tack 1 is placed in a holder 2 which may consist of graphite, magnesia, fire clay, alumina or other refractory material, as shown in Fig. 1. As illustrated by a portion of the holder broken away, the shank of the tack is inserted in a hole so that the tack is supported by the shoulder 3 and is centered by its shank. A plate of copper 4, Fig. 2, is placed upon the tack, and a disk 5 of tungsten is placed upon the copper, the three parts being thus properly held in position. The connecting channels 6 between the holes in the mold are provided for the purpose of promoting the circulation of hydrogen during the subsequent heating process. Only a few holes have been indicated, but of course as many as desired may be used with a single holder. The holder with the metals thus assembled is then placed in a suitable furnace and heated in a hydrogen atmosphere to a temperature at or about the melting point of copper. A porcelain tube furnace, with hydrogen passed through the tube, is suitable for this purpose. Under these conditions, in the absence of oxygen, the copper will wet the surface of the tungsten and the steel and flow over and unite with said surfaces so as to form a continuous metallic weld between the tungsten and the steel. When removed from the furnace and allowed to cool, the tungsten and steel will be found to be intimately united by a layer of copper as indicated in Fig. 3.

What I claim as new and desire to secure by Letters Patent of the United States, is:—

1. The method of securing the adhesion of copper to a body of tungsten, which consists in bringing copper while molten in contact with said tungsten body in an atmosphere of reducing gas.

2. The method of securing the adhesion of copper to a body of tungsten, which consists in bringing copper while molten in contact with said body of tungsten in an atmosphere of hydrogen.

3. The method of joining a tungsten body to copper which consists in chemically removing the surface layer of the tungsten body and introducing copper into contact with said body in a hydrogen atmosphere at a temperature at or above the melting point of copper.

4. A method of metallically uniting tungsten and iron which consists in interposing between the surfaces to be united a layer of copper and heating said metals in a hydrogen atmosphere to a temperature sufficient to melt the copper.

5. The method of securing the "wetting" of tungsten with copper with the formation of a strong metallic union upon solidification of the copper, which consists in subjecting the copper while melted in a thin layer in contact with the tungsten to the action of hydrogen gas.

In witness whereof, I have hereunto set my hand this 27th day of January, 1913.

WILLIAM D. COOLIDGE.

Witnesses:
BENJAMIN B. HULL,
HELEN ORFORD.